US010864849B2

(12) United States Patent
Simms et al.

(10) Patent No.: US 10,864,849 B2
(45) Date of Patent: Dec. 15, 2020

(54) ILLUMINATED STOWAGE BIN ASSEMBLIES WITHIN VEHICLES

(71) Applicant: THE BOEING COMPANY, Chicago, IL (US)

(72) Inventors: Richard K. Simms, Mukilteo, WA (US); Stephen G. Dame, Everett, WA (US); Mark L. Cloud, Seattle, WA (US); Todd D. Smith, Arlington, WA (US)

(73) Assignee: THE BOEING COMPANY, Chicago, IL (US)

(*) Notice: Subject to any disclaimer, the term of this patent is extended or adjusted under 35 U.S.C. 154(b) by 310 days.

(21) Appl. No.: 15/623,611

(22) Filed: Jun. 15, 2017

(65) Prior Publication Data

US 2018/0257555 A1 Sep. 13, 2018

Related U.S. Application Data

(60) Provisional application No. 62/469,600, filed on Mar. 10, 2017.

(51) Int. Cl.
*B60Q 3/30* (2017.01)
*B64D 11/00* (2006.01)
*B61D 29/00* (2006.01)
*B60Q 3/41* (2017.01)

(52) U.S. Cl.
CPC ............... *B60Q 3/30* (2017.02); *B61D 29/00* (2013.01); *B64D 11/003* (2013.01); *B60Q 3/41* (2017.02)

(58) Field of Classification Search
None
See application file for complete search history.

(56) References Cited

U.S. PATENT DOCUMENTS

| | | | | |
|---|---|---|---|---|
| 5,781,408 | A | 7/1998 | Crane | |
| 6,945,581 | B2 * | 9/2005 | Taylor | B60R 7/04 200/61.76 |
| 8,408,766 | B2 * | 4/2013 | Wilson | B60Q 3/68 362/496 |
| 8,955,802 | B2 | 2/2015 | Zinke | |
| 9,013,328 | B2 | 4/2015 | Hashberger | |
| 10,041,650 | B2 * | 8/2018 | Salter | B60R 7/06 |
| 2002/0184497 | A1 | 12/2002 | Gage | |
| 2004/0227374 | A1 | 11/2004 | Hirota | |
| 2005/0121932 | A1 | 6/2005 | Taylor | |
| 2007/0133217 | A1 | 6/2007 | Tiesler | |
| 2008/0055836 | A1 | 3/2008 | Lamoree | |

(Continued)

FOREIGN PATENT DOCUMENTS

| | | |
|---|---|---|
| DE | 102004053140 | 5/2006 |
| DE | 102014114915 | 4/2016 |

(Continued)

OTHER PUBLICATIONS

Communication re EP 18160743.3-1010, dated Feb. 20, 2020.
Communication re EP 18160758.1-1010, dated Feb. 20, 2020.

*Primary Examiner* — Elmito Breval
(74) *Attorney, Agent, or Firm* — The Small Patent Law Group LLC; Joseph M. Butscher

(57) ABSTRACT

A stowage bin assembly of a vehicle includes one or more interior light-emitting elements that are configured to illuminate a baggage retaining chamber of the stowage bin assembly. The stowage bin assembly is within an interior cabin of the vehicle.

20 Claims, 10 Drawing Sheets

(56) References Cited

U.S. PATENT DOCUMENTS

2008/0071398 A1 3/2008 Kneller
2008/0078869 A1 4/2008 Kneller
2008/0078870 A1 4/2008 Kneller
2008/0078871 A1 4/2008 Munson
2009/0166415 A1 7/2009 Braun
2009/0178427 A1 7/2009 Eichman
2011/0199182 A1 8/2011 Catlin
2012/0230047 A1* 9/2012 Smith ........................ B60R 7/04 362/543
2013/0233971 A1 9/2013 Burrows
2013/0290221 A1 10/2013 Jindel
2015/0046027 A1* 2/2015 Sura ........................ B60K 35/00 701/36
2015/0197189 A1* 7/2015 Salter ...................... B60R 11/00 362/510
2015/0210393 A1* 7/2015 Savian ............... B64D 11/0601 244/118.6
2015/0360780 A1* 12/2015 Kammerer ........... B64D 11/003 244/118.5
2016/0109280 A1* 4/2016 Tiu ........................... G01D 7/00 702/173
2016/0189498 A1 6/2016 Sharma
2016/0238214 A1* 8/2016 Hashimoto ............ B64D 11/00
2016/0238215 A1* 8/2016 Ohta ...................... B64D 11/00
2017/0152044 A1 6/2017 Balasubramanian
2018/0092484 A1 4/2018 Lewis
2018/0257554 A1 9/2018 Simms
2018/0257555 A1 9/2018 Simms
2018/0257783 A1 9/2018 Simms
2018/0257784 A1 9/2018 Simms
2018/0261026 A1 9/2018 Simms

FOREIGN PATENT DOCUMENTS

EP 2492194 A1 * 8/2012 ........... B64D 11/003
EP 3173329 5/2017

* cited by examiner

ILLUMINATED STOWAGE BIN ASSEMBLIES WITHIN VEHICLES

RELATED APPLICATIONS

This application relates to and claims priority benefits from U.S. Provisional Patent Application No. 62/469,600, entitled "Electronic Stowage Bin Control Systems and Methods," filed Mar. 10, 2017, which is hereby incorporated by reference in its entirety.

FIELD OF EMBODIMENTS OF THE DISCLOSURE

Embodiments of the present disclosure generally relate to interior cabins within vehicles, such as commercial aircraft, and, more particularly, to electronic stowage bin control systems and methods within interior cabins of vehicles.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Overhead stowage bins are typically positioned above rows of seats within a commercial aircraft. Each overhead stowage bin is configured to be moved between an open position and a closed position. In the open position, passengers may place carry-on luggage within a moveable bin or bucket. Before the aircraft leaves a terminal, flight attendants ensure that each stowage bin is securely closed.

In order to open a stowage bin, an individual (such as a passenger or flight attendant) physically touches a latch of the stowage bin. For example, the individual first grasps and pulls the latch in order to manipulate the stowage bin into an open position. As can be appreciated, the latch of the stowage bin is touched by numerous individuals many times. Consequently, various germs and bacteria may be present on the latch if the latch is not regularly cleaned. Moreover, certain individuals may find grasping and manipulating the latch difficult.

Further, during a flight, attendants are generally unable to prevent passengers from opening stowage bins. At times when passengers are supposed to be securely buckled in their seats (such as during takeoff, landing, or periods of turbulence), a passenger has the ability to stand up, and open a stowage bin, which may lead to a hazardous situation. For example, during periods of turbulence, contents within an open stowage bin may fall out into an aisle or even onto passengers.

SUMMARY OF THE DISCLOSURE

A need exists for a stowage bin assembly that may be opened and closed without being touched by an individual. A need exists for a stowage bin assembly that may be controlled by flight personnel. A need exists for a system and method of preventing passengers from opening stowage bin assemblies during restricted periods of a flight, such as during takeoff, landing, and periods of turbulence.

With those needs in mind, certain embodiments of the present disclosure provide a stowage bin control system for a vehicle. The stowage bin control system includes at least one stowage bin assembly that is configured to be selectively moved between an open position and a closed position. A master control device is separate and distinct from the stowage bin assemblies. The master control device is communicatively coupled through a wireless connection to the stowage bin assemblies and is configured to operate the stowage bin assemblies.

In at least one embodiment, the master control device is configured to automatically move the stowage bin assemblies between the open position and the closed position. Each stowage bin assembly includes a latch that is configured to selectively lock and unlock the stowage bin assembly. The master control device is configured to automatically lock and unlock the latch. The latch is operatively coupled to one or more latching mechanisms.

In at least one embodiment, the master control device includes a master stowage bin control unit that is in communication with stowage bin assemblies. One or more of the stowage bin assemblies may include a stowage bin control unit in communication with the master stowage bin control unit. The master control device may include a user interface that is configured to allow an individual to input commands.

In at least one embodiment, a plurality of stowage bin assemblies are communicatively coupled to the master control device. The master control device may simultaneously open or close the plurality of stowage bin assemblies. The master control device may open or close the plurality of stowage bin assemblies in a staggered fashion. The master control device may synchronize opening or closing of the stowage bin assemblies with lighting effects, sounds, graphics, and/or video. In at least one embodiment, the master control device is configured to transition the stowage bin assemblies into a manual override mode in which a user is able to manually open and close the stowage bin assemblies in response to reception of one or more error signals from the stowage bin assemblies.

The stowage bin assemblies may be configured to output report signals to the master control device. The report signals includes data regarding operational health or status.

The stowage bin assembly may include a proximity sensor that is configured to detect presence of an object within a detection range. The proximity sensor may be mounted to an outer surface of the stowage bin assembly. The proximity sensor may be configured to selectively switch the stowage bin assembly between a locked and unlocked state.

The stowage bin assembly may include one or more exterior light-emitting elements. The exterior light-emitting elements are configured to emit light to indicate a current status of the stowage bin assembly. The exterior light-emitting element(s) may be proximate to a latch of the stowage bin assembly.

The stowage bin assembly may include a motion sensor that is configured to detect motion within a detection range. The motion sensor may be proximate to a latch of the stowage bin assembly. The motion sensor may be configured to be engaged to automatically open or close the stowage bin assembly without an individual touching the stowage bin assembly.

The stowage bin assembly may include one or more interior light-emitting elements. The light-emitting element (s) may be disposed within a baggage retaining chamber of the stowage bin assembly. The interior light-emitting element(s) may be configured to illuminate a baggage retaining chamber of the stowage bin assembly. The interior light-emitting element(s) may be configured to illuminate the baggage retaining chamber when the stowage bin assembly is in the open position, and may be deactivated when the stowage bin assembly is in the closed position. In at least one embodiment, the interior light-emitting element(s) emit light that gradually intensifies as the stowage bin assembly is opened, and emit light that gradually fades as the stowage bin assembly is closed.

The stowage bin assembly may include a bin position sensor that is configured to detect a position of the stowage bin assembly.

The stowage bin assembly may include a weight sensor that is configured to detect the weight of the stowage bin assembly.

The stowage bin assembly may include at least one touch sensor that is configured to be touched in order to lock, unlock, close, and/or open the stowage bin assembly.

In at least one embodiment, the stowage bin assembly includes a bucket having a front panel connected to a forward end panel and an aft end panel. A baggage retaining chamber is defined, at least in part, between the front panel, the forward end panel, and the aft panel. The front panel may include an arcuate panel having a curved outer surface.

Certain embodiments of the present disclosure provide a vehicle that includes an interior cabin, and a stowage bin control system. The stowage bin control system includes at least one stowage bin assembly within the interior cabin. The stowage bin assembly is configured to be selectively moved between an open position and a closed position. A master control device is separate and distinct from the stowage bin assembly. The master control device is wirelessly communicatively coupled to the stowage bin assembly and is configured to operate the stowage bin assembly.

Certain embodiments of the present disclosure provide a stowage bin control method for a vehicle. The stowage bin control method includes wirelessly communicatively coupling a master control device to at least one stowage bin assembly within the vehicle, and using the master control device to operate the stowage bin assembly.

Certain embodiments of the present disclosure provide a stowage bin assembly for a vehicle. The stowage bin assembly includes a latch that is configured to selectively lock and unlock the stowage bin assembly. The stowage bin assembly also includes one or more of a proximity sensor that is configured to detect presence of an object, a motion sensor that is configured to detect motion within a detection range, or at least one touch sensor that is configured to be touched in order to lock, unlock, close, and/or open the stowage bin assembly.

The stowage bin assembly may also include one or more exterior light-emitting elements. The exterior light-emitting elements are configured to emit light to indicate a current status of the stowage bin assembly.

The stowage bin assembly may also include one more interior light-emitting elements configured to illuminate a baggage retaining chamber of the stowage bin assembly, a bin position sensor that is configured to detect a position of the stowage bin assembly, and/or a weight sensor that is configured to detect the weight of the stowage bin assembly.

Certain embodiments of the present disclosure provide a stowage bin assembly that includes a latch that is configured to selectively lock and unlock the stowage bin assembly, and a sensor in communication with the latch. The sensor is configured to be engaged to lock, unlock, open, and/or close the stowage bin assembly without the latch or the sensor being touched.

In at least one embodiment, the sensor includes a proximity sensor that is configured to detect presence of an object within a detection range. In at least one embodiment, the sensor includes a motion sensor that is configured to detect motion within a detection range.

Certain embodiments of the present disclosure provide a method of operating a stowage bin assembly. The method includes communicatively coupling a latch that is configured to selectively lock and unlock the stowage bin assembly to a sensor, and engaging the sensor to one or more of lock, unlock, open, or close the stowage bin assembly without the latch or the sensor being touched.

Certain embodiments of the present disclosure provide a stowage bin assembly that includes one or more interior light-emitting elements configured to illuminate a baggage retaining chamber of the stowage bin assembly. The interior light-emitting elements may be disposed within the baggage retaining chamber of the stowage bin assembly.

In at least one embodiment, the interior light-emitting elements are configured to illuminate the baggage retaining chamber when the stowage bin assembly is in an open position, and wherein the one or more interior light-emitting elements are deactivated when the stowage bin assembly is in a closed position. The interior light-emitting elements may emit light that gradually intensifies as the stowage bin assembly is opened, and gradually fades as the stowage bin assembly is closed.

Certain embodiments of the present disclosure provide a method of operating a stowage bin assembly. The method includes illuminating a baggage retaining chamber of the stowage bin assembly with one or more interior light-emitting elements.

Certain embodiments of the present disclosure provide a stowage bin assembly that includes a weight sensor that is configured to detect the weight of the stowage bin assembly.

Certain embodiments of the present disclosure provide a method of operating a stowage bin assembly that includes detecting a weight of the stowage bin assembly using a weight sensor of the stowage bin assembly.

DETAILED DESCRIPTION OF THE DISCLOSURE

Figure 1:
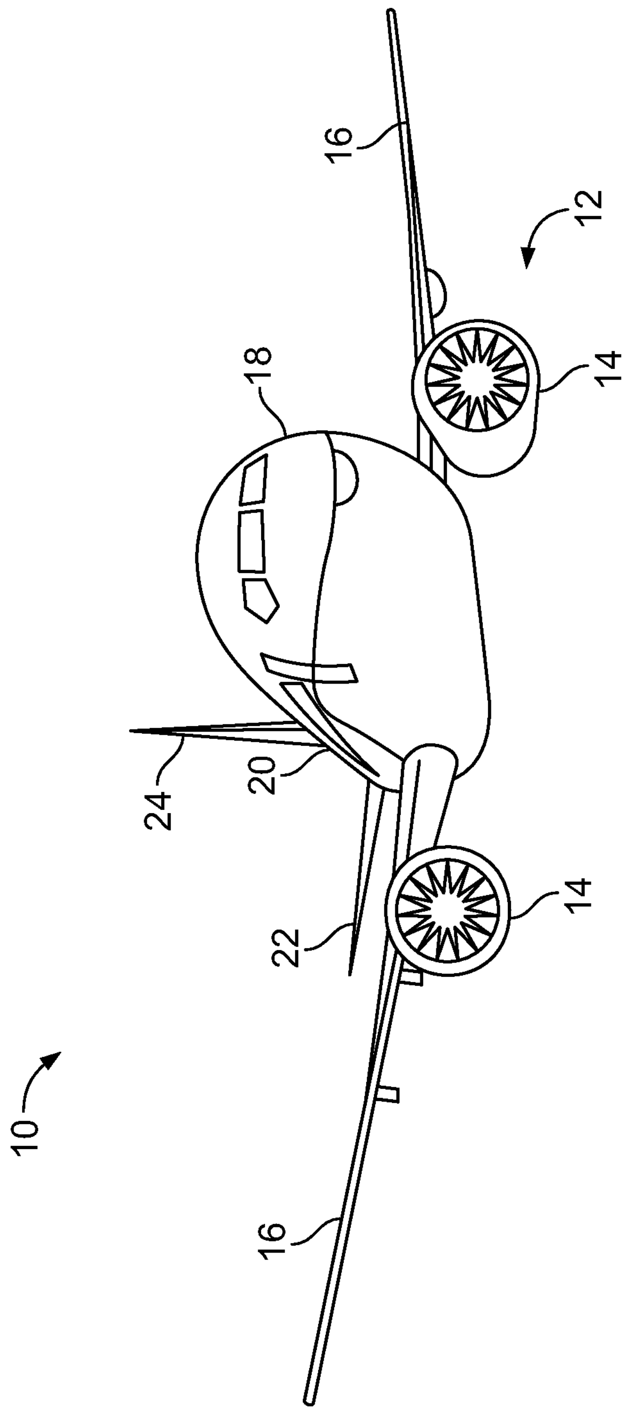
FIG. 1 illustrates a front perspective view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide touch-free activated stowage bin assemblies. The stowage bin assemblies may be selectively moved between open and closed positions without an individually physically touching them. Further, the stowage bin assemblies may be controlled by one or more stowage bin control units. The stowage bin control units may be operated by aircraft personnel (such as a pilot or flight attendant) to prevent passengers from opening the stowage bin assemblies during restricted periods (such as takeoff, landing, periods of turbulence, and the like).

In at least one embodiment, the stowage bin assembly includes an electronic latch that is configured to be automatically locked and opened. In at least one embodiment, the latch includes a sensor (such as proximity or motion sensor) that is configured to detect hand motion within a predefined detection range (such as within 3 or 4 inches from the sensor). In this manner, an individual may move a hand within close proximity of the latch (such as within six inches or less) to operatively engage the latch without physically touching the latch. Individuals may simply wave their hands in front of the latch to automatically open the stowage bin assembly.

A stowage bin control unit in communication with the latches of the stowage bin assemblies (such as through one or more wired or wireless connections) may be used to lock the latches, and prevent the latches from switching to open states. In this manner, aircraft personnel may lock the latches to prevent passengers from opening the stowage bin assemblies. The stowage bin control unit may be within a computer onboard the aircraft, such as within a work station or control panel in a galley or cockpit. In at least one other embodiment, the stowage bin control unit may be within a handheld device, such as a handheld smart device or cellular phone.

In at least one embodiment, flight personnel may swipe a badge in front of the latch to set the latch in a locked state. The latch may include one or more light-emitting elements (such as light emitting diodes—LEDs) that indicate whether or not the latch is locked. For example, in the locked state, a light-emitting element may emit red light. In an unlocked state, the light-emitting element may emit green light.

Certain embodiments of the present disclosure provide an electronic stowage bin system that is wirelessly controllable. The stowage bin system includes a stowage bin assembly having a latching mechanism coupled to a door, an electrical button on or proximal to the stowage bin assembly to control the electric latch, and an electric drive system to at least assist with forces required to manipulate the bin through at least a portion of its range of motion. In at least one embodiment, aircraft personnel are able to control one or all of the stowage bin assemblies from a control panel or personal electronic device (PED), such as a handheld control device, an electronic tablet, cellular phone, or other such smart device. Passengers may also have limited control of the overhead stowage bin assemblies from their PEDs.

Certain embodiments of the present disclosure provide an overhead stowage bin system that includes a plurality of wirelessly controlled features. The overhead stowage bin system includes a plurality of stowage bin assemblies. One or more of the stowage bin assemblies include an electronic latch, an electronic actuator, and an electronic proximal control. An electronic control device may be used to control the wirelessly-controlled features of the stowage bin assemblies.

The wireless coupling of the various components of the stowage bin system provides a lightweight and spacious stowage bin assembly. That is, routing multiple wires within the stowage bin assembly would take up space and also add weight.

In at least one embodiment, one or more of the stowage bin assemblies includes an electronic light source (such as one or more LEDs). The light source may be within a closed area of the stowage bin assembly. The light source may be configured to gradually illuminate on and gradually fade off, which coincide with the respective opening and closing motion of the bin. The stowage bin assembly may also include a sensor for determining an instantaneous position, such as the rotational position of the bin relative to the aircraft.

The system may include pre-programmed control sequences for all or some of the features, including choreographed opening/closing of bins, and automatic locking of bins during certain portions of a trip. At least some of the pre-programmed control sequences ensure compliance with safety and security requirements as promulgated by the United States Federal Aviation Administration (FAA).

In at least one embodiment, the system defaults to a manual override mode in which a user is able to manually open and close the bin by physically manipulating the bin.

In at least one embodiment, the stowage bin assemblies are programmable (for example, the latches may be programmed to lock or unlock at various times). As an example, the stowage bin assemblies may be programmed to open or close in a wave action, synchronized with cabin lighting, sound schemes, and/or the like.

The proximal control button may be a capacitive touch surface that emits light. In at least one other embodiment, the proximal control button may include a proximity or motion sensor, so as to be activated via a wave of a hand, for example. In at least one other embodiment, the proximal control button may be configured for voice control.

Each stowage bin assembly may be configured to report information to a master control unit so as to indicate operational health and/or status, such as bin capacity status, maintenance needs, usage data that could speed loading and unloading procedures, and the like.

In at least one embodiment, at least some of the system is powered from a power and/or data strip.

Embodiments of the present disclosure provide stowage bin systems, methods, and assemblies that provide various advantages, including: improved accessibility for persons having reduced mobility; improved passenger experience, low cost lightweight design; efficient, safe, aesthetic, and ergonomic aircraft interiors; less aircraft down time; faster turn-around time; faster embarkment and disembarkment; increased bin capacity (not limited by ergonomics/varying human strength limitations); easier crew operations—better service aboard airplane; reduction of repetitive physical tasks of pushing stow bins closed, for example; and improved aircraft health management.

FIG. 1 illustrates a front perspective view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area. Overhead stowage bin assemblies are positioned throughout the interior cabin.

Alternatively, instead of an aircraft, embodiments of the present disclosure may be used with various other vehicles, such as automobiles, buses, locomotives and train cars, seacraft, spacecraft, and the like.

Figure 2A:
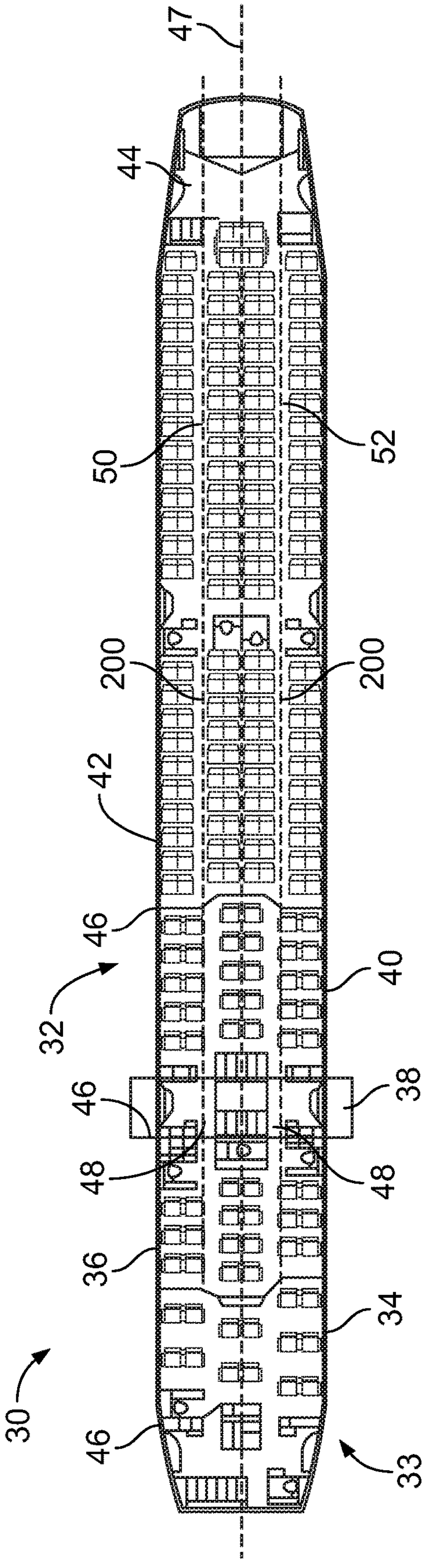
FIG. 2A illustrates a top plan view of an interior cabin of an aircraft, according to an embodiment of the present disclosure.

FIG. 2A illustrates a top plan view of an interior cabin 30 of an aircraft, according to an embodiment of the present disclosure. The interior cabin 30 may be within a fuselage 32 of the aircraft. For example, one or more fuselage wall members may define the interior cabin 30. The interior cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the interior cabin 30 may include more or less sections than shown. For example, the interior cabin 30 may not include a first class section, and may include more or less galley stations than shown. Each of the sections may be separated by a cabin transition area 46, which may include class divider assemblies between aisles 48.

As shown in FIG. 2A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

One or more electrical signal distribution systems 200 may be secured to one or more structural components within the interior cabin 30. As shown, each electrical signal distribution system 200 may run parallel with a longitudinal axis 47 of the interior cabin 30. Optionally, the electrical signal distribution systems 200 may not be parallel to the longitudinal axis 47. For example, at least one electrical signal distribution system 200 may span across the interior cabin 30 such that it is perpendicular to the longitudinal axis 47. The interior cabin 30 may include more or less electrical distribution systems 200 than shown. For example, an electrical distribution system 200 may be positioned over each longitudinal section of seats onboard an aircraft.

The electrical signal distribution systems 200 may span from a fore or front section 33 to the aft section 44. The electrical signal distribution systems 200 may span an entire length of the interior cabin 30. Optionally, the electrical signal distribution systems 200 may span less than an entire length of the interior cabin 30.

The electrical signal distribution systems 200 may be secured to various structural components within the interior cabin 30. For example, the electrical signal distribution systems 200 may be securely mounted to strongbacks, passenger service unit (PSU) troughs, stowbins, PSU rails, floor member structure, ceiling structure, wall member structure, and/or the like. The electrical signal distribution systems 200 are configured to provide electrical signals, such as power signals and/or data signals, to various electrical devices within the interior cabin, as described below.

The electrical signal distribution systems 200 are further described in U.S. patent application Ser. No. 15/287,949, entitled "Systems and Methods for Providing Electrical Signals to Electrical Devices Within an Interior Cabin of a Vehicle," which is hereby incorporated by reference in its entirety.

Figure 2B:
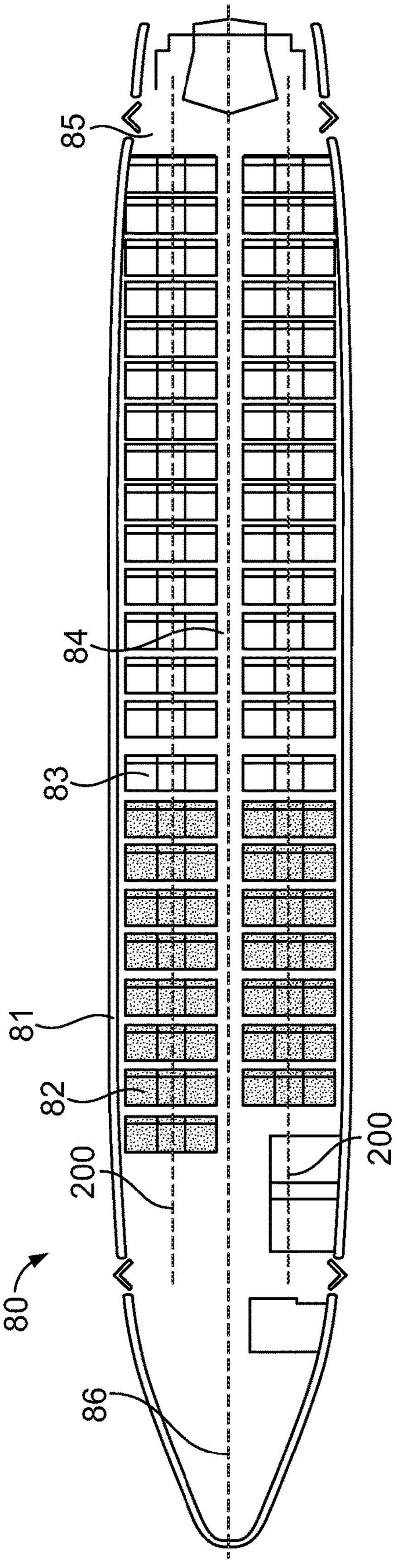
FIG. 2B illustrates a top plan view of an interior cabin of an aircraft, according to an embodiment of the present disclosure.

FIG. 2B illustrates a top plan view of an interior cabin 80 of an aircraft, according to an embodiment of the present disclosure. The interior cabin 80 may be within a fuselage 81 of the aircraft. For example, one or more fuselage wall members may define the interior cabin 80. The interior cabin 80 includes multiple sections, including a main cabin 82 having passenger seats 83, and an aft section 85 behind the main cabin 82. It is to be understood that the interior cabin 80 may include more or less sections than shown.

The interior cabin 80 may include a single aisle 84 that leads to the aft section 85. The single aisle 84 may extend through the center of the interior cabin 80 that leads to the aft section 85. For example, the single aisle 84 may be coaxially aligned with a central longitudinal plane 86 of the interior cabin 80. One or more electrical signal distribution systems 200 may be secured to structural components within the interior cabin 80.

Figure 3:
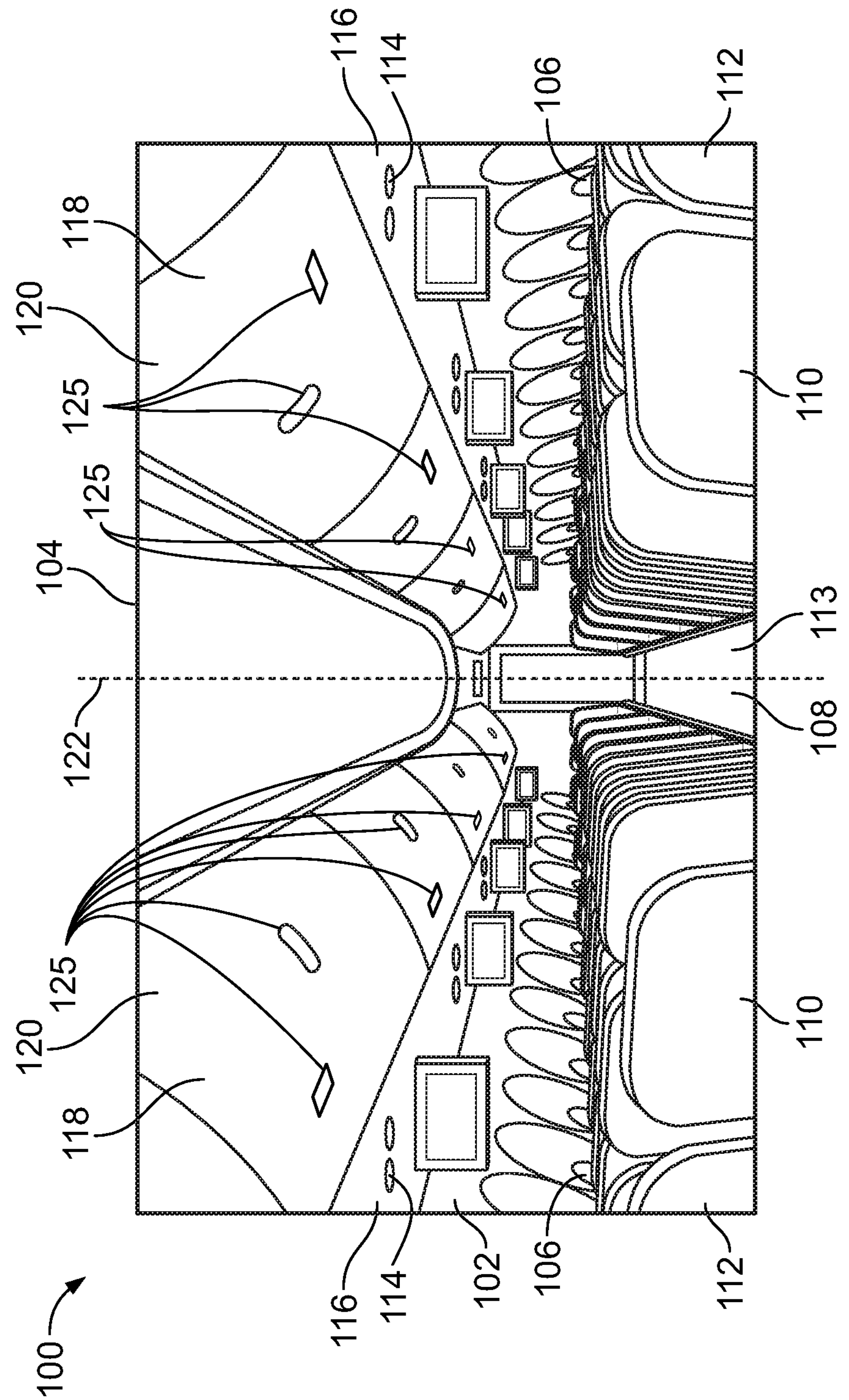
FIG. 3 illustrates an interior perspective view of an interior cabin of an aircraft, according to an embodiment of the present disclosure.

FIG. 3 illustrates an interior perspective view of an interior cabin 100 of an aircraft, according to an embodiment of the present disclosure. The interior cabin 100 includes outboard wall members 102 and a ceiling 104, which may include a plurality of ceiling panels. Windows 106 may be formed within the outboard wall members 102. A floor member 108 supports rows of seats 110. As shown in FIG. 3, a row 112 may include two seats 110 on either side of an aisle 113. However, the row 112 may include more or less seats 110 than shown. Additionally, the interior cabin 100 may include more aisles than shown.

Electrical devices such as PSUs 114 are secured between an outboard wall member 102 and the ceiling 104 on either side of the aisle 113. The PSUs 114 extend between a front end and rear end of the interior cabin 100. For example, a PSU 114 may be positioned over each seat 110 within a row 112. Each PSU 114 may include a housing 116 that generally contains passenger air outlets, reading lights, an oxygen supply system (such as an oxygen bag drop panel), an attendant call button, and other such controls over each seat 110 (or groups of seats) within a row 112.

Overhead stowage bin assemblies 118 are secured to the structure proximate to the ceiling 104 and/or the outboard wall member 102 above and inboard from the PSU 114 on either side of the aisle 113. The overhead stowage bin assemblies 118 are secured over the seats 110. The overhead stowage bin assemblies 118 extend between the front and rear end of the interior cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the interior cabin 100 as compared to another component. The term "inboard" means a position that is closer to the central longitudinal plane 122 of the interior cabin 100 as compared to another component. For example, a lower surface of a PSU 114 may be outboard in relation to a stowage bin assembly 118.

At least one electrical signal distribution system 200 (shown in FIGS. 2A and 2B, but hidden from view in FIG. 3) may extend over a length of the interior cabin 100 and run parallel with the longitudinal plane 122. For example, an electrical signal distribution system 200 may be mounted to strongbacks of the stowage bin assemblies 118. Optionally, the electrical signal distribution system 200 may be mounted to PSU rails that secure the PSUs 114 in position. As another example, the electrical signal distribution system 200 may be mounted to floor portions or ceiling structure.

Electrical devices 125 may be mounted on the buckets 120 of the stowage bin assemblies 118. As shown, the electrical devices 125 may be secured to exterior surfaces of the buckets 120. Optionally, the electrical devices 125 may be secured to interior surfaces of the buckets 120. In at least one embodiment, the electrical devices 125 may be embedded within the buckets 120. The electrical device 125 may be one or more of an electric latch or lock, a speaker, a lighting assembly (such as one or more light emitting diodes), a monitor (such as a video screen and/or touchscreen), a fan, one or more sensors, and/or the like. Electrical devices may also be installed within a PSU trough, adjacent to reading light panels, for example.

The electrical device 125 in the form of an electric latch may be at various areas of the bucket 120. For example, the latches may be at or proximate a middle of a front face of the bucket 120, proximate upper ends, lower ends, lateral portions, and/or the like. In at least one embodiment, the latches may not be on the bucket 120, but may be on a structural feature to which the stowage bin assemblies 118 are secured.

Figure 4:
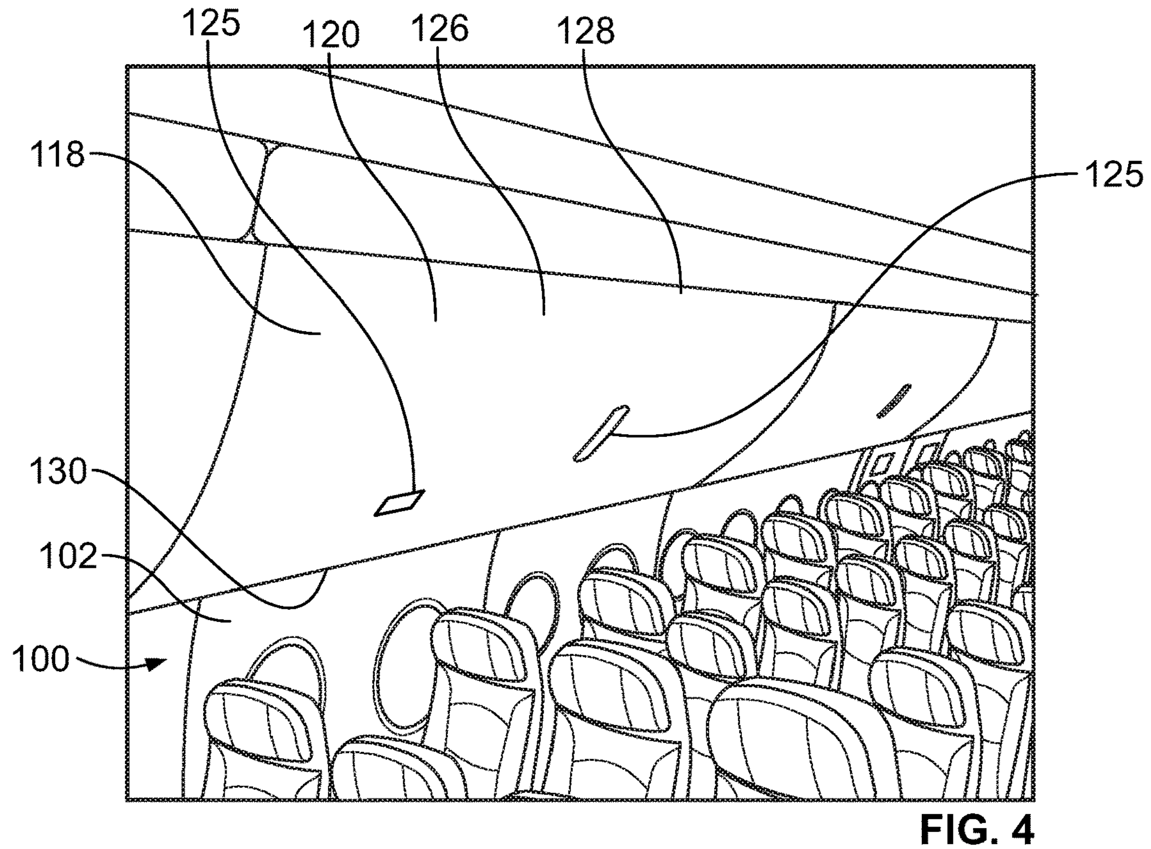
FIG. 4 illustrates a front perspective view of a stowage bin assembly in a closed position within an interior cabin, according to an embodiment of the present disclosure.

FIG. 4 illustrates a front perspective view of a stowage bin assembly 118 in a closed position within the interior cabin 100, according to an embodiment of the present disclosure. The stowage bin assembly 118 includes a bucket 120 having a front panel 126 connected to forward and aft end panels (hidden from view in FIG. 4). As shown, the front panel 126 may be an arcuate panel having a curved outer surface that curves downwardly toward the outboard wall member 102. As such, a top portion 128 of the front panel 126 is inboard in relation to a lower portion 130. The electrical device 125 may be secured to and/or embedded within the front panel 126. As noted, the electrical device 125 may be an electronic latch, proximal control member (such as a button), proximity or motion sensor, and/or the like.

Figure 5:
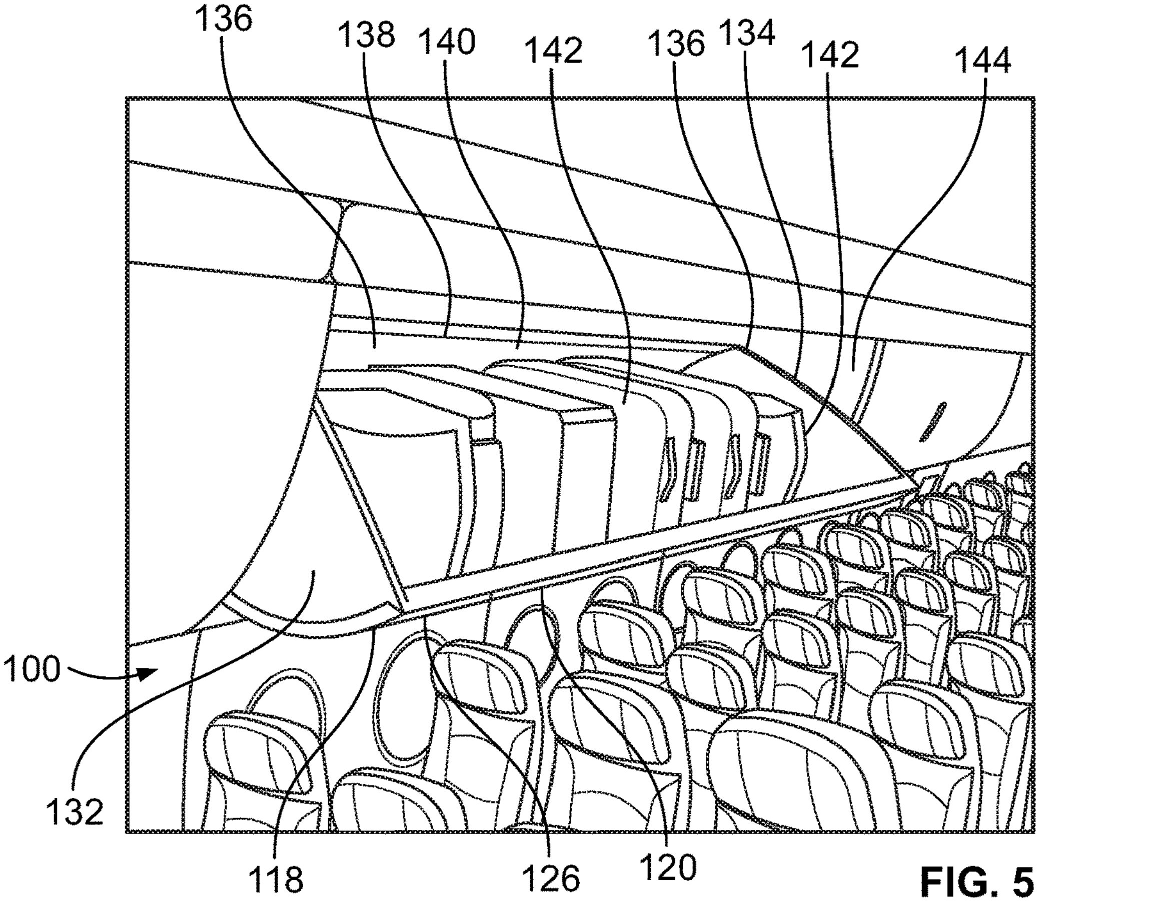
FIG. 5 illustrates a front perspective view of a stowage bin assembly in an open position within an interior cabin, according to an embodiment of the present disclosure.

FIG. 5 illustrates a front perspective view of the stowage bin assembly 118 in an open position within the interior cabin 100, according to an embodiment of the present disclosure. As shown, the front panel 126 is secured to a forward end panel 132 and an aft end panel 134, which may generally be opposed and parallel to one another. The front panel 126 and the end panels 132 and 134 may also connect to a bottom panel 136. The bottom panel 136 may be an inwardly curved portion of the front panel 126, for example. In at least one embodiment, a closeout bracket 138 may span between the end panels 132 and 134 and provide a rigid bracing support therebetween. The front panel 126 may be thicker than the end panels 132 and 134, as the front panel 126 is configured to directly support a weight of overhead bags. As such, the front panel 126 may have increased thickness in order to provide additional support strength and rigidity.

A baggage retaining chamber 140 is defined between the front panel 126, the end panels 132 and 134, and the bottom panel 136. The baggage retaining chamber 140 is configured to receive baggage 142 when the stowage bin assembly 118 is in the open position.

The end panels 132 and 134 are each pivotally secured to fixed panels 144, such as fixed panels of a strongback. That is, the fixed panels 144 may be part of a strongback within the interior cabin 100.

An example of a stowage bin assembly is described in U.S. patent application Ser. No. 14/682,217, entitled "Overhead Stowage Bin Assembly for a Vehicle," which is hereby incorporated by reference in its entirety. It is to be understood, however, that various other types of stowage bin assemblies may be used with respect to embodiments of the present disclosure. The stowage bin assembly 118 shown in FIGS. 4 and 5, as well as those described in U.S. patent application Ser. No. 14/682,217, are merely exemplary.

Figure 6:
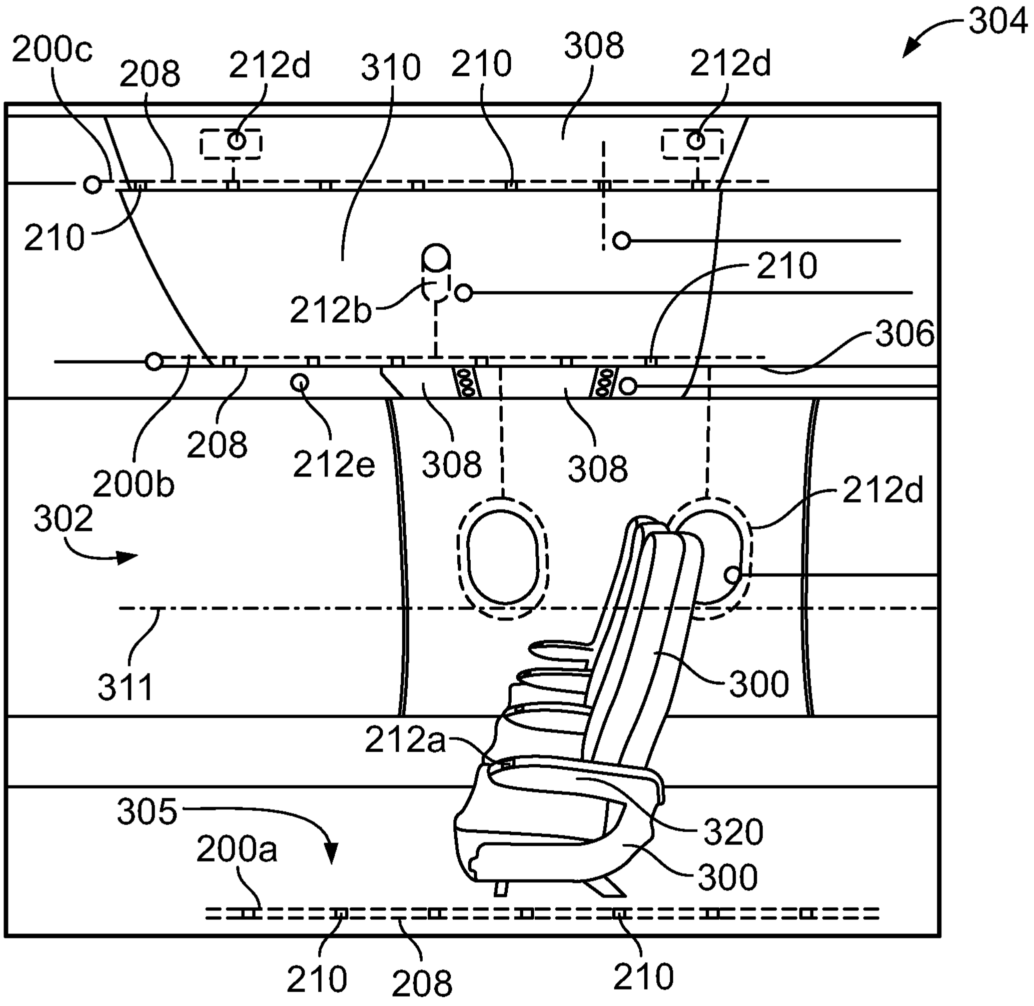
FIG. 6 illustrates a lateral perspective view of a row of seats within an interior cabin of a vehicle, according to an embodiment of the present disclosure.

FIG. 6 illustrates a lateral perspective view of a row of seats 300 within an interior cabin 302 of a vehicle 304, according to an embodiment of the present disclosure. The interior cabin 302 may include a first electrical signal distribution system 200*a* mounted to a floor member 305 of the interior cabin, a second electrical signal distribution system 200*b* mounted to a PSU rail 306 that supports PSUs 308 below stowage bin assemblies 310, and a third electrical signal distribution system 200*c* mounted to a ceiling 308 of the interior cabin 302. Optionally, the interior cabin 302 may include less than all of the electrical signal distribution systems 200*a*, 200*b*, and 200*c*.

As shown, the electrical signal distribution systems 200*a*, 200*b*, and 200*c* extend along a length of the interior cabin 302. The electrical signal distribution systems 200*a*, 200*b*, and 200*c* are parallel with a central longitudinal axis 311 of the interior cabin 302, or at least a portion thereof. Optionally one or more electrical signal distribution systems may be laterally oriented with respect to the interior cabin 302, such that they are perpendicular to the central longitudinal axis 311.

Various electrical devices may be coupled to outlets 210 of the electrical signal distribution systems 200*a*, 200*b*, and 200*c*. For example, consoles 212*a* on armrests 320 of the seats 300 may be electrically coupled to the electrical signal distribution system 200*a*. The consoles 212*a* may be or include a display, such as a monitor, touchscreen, and/or the like. Optionally, the consoles 212*a* may be mounted to rear surfaces of seats. The PSUs 308 and stowbin latches 212*b* may be electrically coupled to the electrical signal distribution system 200*b*. Accent lighting assemblies 212 and speakers may be electrically coupled to the electrical signal distribution system 200*c*. Further, lighting assemblies 212*d* may be electrically coupled to the electrical distribution system 200*b*.

Also, microphones 212*e* may be electrically coupled to the electrical distribution system 200*b*. The microphones 212*e* may be located throughout the interior cabin 702, and allow a flight attendant to broadcast messages during a flight.

The electrical signal distributions systems 200*a-c* replace wiring and bundles traditionally used to connect electrical devices to power and data sources. Regularly-spaced outlets 210 on the PCBs 208 allow for quick and easy connection to various electrical devices throughout the interior cabin 302.

Figure 7:
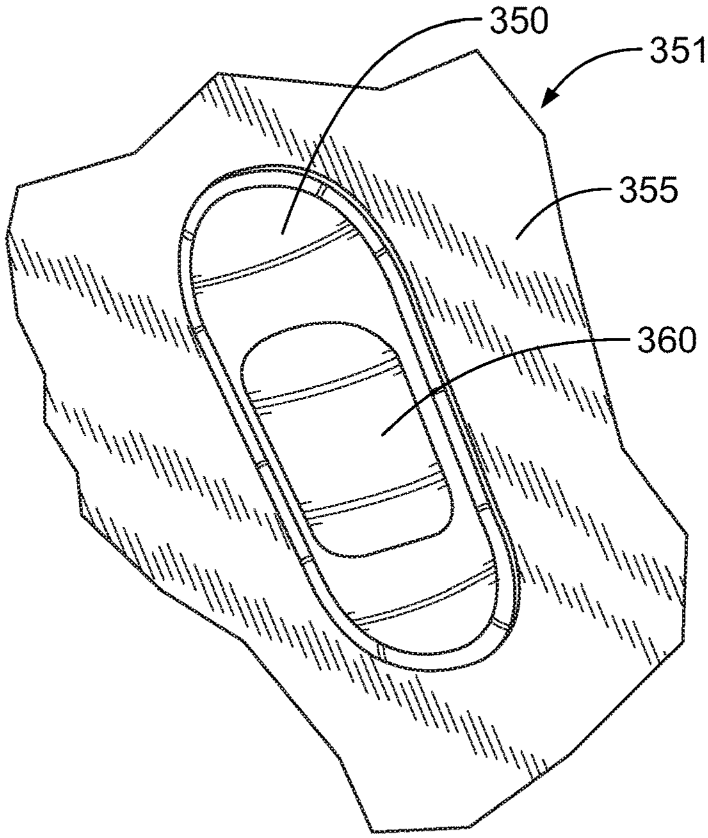
FIG. 7 illustrates a front view of a latch of a stowage bin assembly, according to an embodiment of the present disclosure.

FIG. 7 illustrates a front view of a latch 350 of a stowage bin assembly 351, according to an embodiment of the present disclosure. The latch 350 is an example of the latch 212*b* shown in FIG. 6. The latch 350 is mounted on a front panel 355 of stowage bin assembly 351. Optionally, the latch 350 may be mounted on other portions of the stowage bin assembly 351. The latch 350 includes an activation button 360 within the latch button that includes an electrical switch coupled to a latching mechanism (not shown in FIG. 7).

Figure 8:
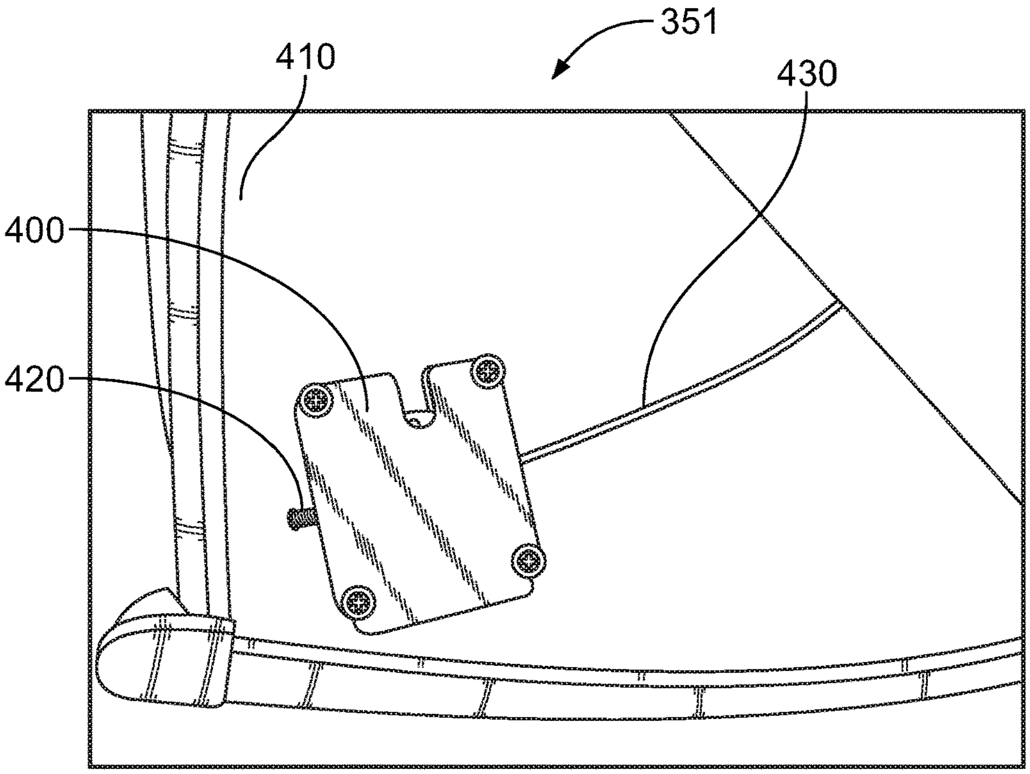
FIG. 8 illustrates a latching mechanism of a stowage bin assembly, according to an embodiment of the present disclosure.

FIG. 8 illustrates a latching mechanism 400 of the stowage bin assembly 351, according to an embodiment of the present disclosure. The latching mechanism 400 may be mounted on a sidewall 410 of bucket (such as the bucket 120 shown in FIGS. 4 and 5), a strongback, or the like. The latching mechanism 400 may include a solenoid-driven member 420 that pushes the door of the aircraft stowage bin open upon activation and may also include latching elements used to keep the door closed when a passenger or airline attendant pushes the door closed. A cable 430 may be coupled between the electronic switch in the latch 350 (shown in FIG. 3) and the latching mechanism 400. Optionally, the electronic switch in the latch 350 and the latching mechanism may communicate through a wireless connection.

Referring to FIGS. 7 and 8, when the latch 350 is activated by a passenger or airline attendant, an electrical signal is passed via electrical conductors in the cable 430 from the latch 350 to the latching mechanism 400 to cause the latching mechanism 400 to push the door or bucket of the stowage bin assembly 351 open.

An example of the latch 350 and the latching mechanism 400 is further described in U.S. patent application Ser. No. 14/542,265, entitled "Self-Contained Electronic Stowage Bin System," which is hereby incorporated by reference in its entirety. As described in U.S. patent application Ser. No. 14/542,265, the stowage bin assembly may include an energy harvesting system and energy storage that are configured to supply power to the latch 350 and/or the latching mechanism 400. In at least one other embodiment, the latch 350 and/or the latching mechanism 400 may be configured to receive power and/or data from an electrical distribution system 200 (shown in FIGS. 2A, 2B, and 6), as described in U.S. patent application Ser. No. 15/287,949, entitled "Systems and Methods for Providing Electrical Signals to Electrical Devices Within an Interior Cabin of a Vehicle." As yet another example, the latch 350 and/or the latching mechanism 400 may be configured to receive power and/or data through systems and methods as described in U.S. patent application Ser. No. 15/281,263, entitled "Systems and Methods for Wirelessly Transmitting Electrical Signals to an Overhead Stowage Bin Assembly of a Vehicle," which is hereby incorporated by reference in its entirety. Alternatively, the latch 350 and/or the latching mechanism 400 may be configured to receive power and/or data through one or more wired connections.

Figure 9:
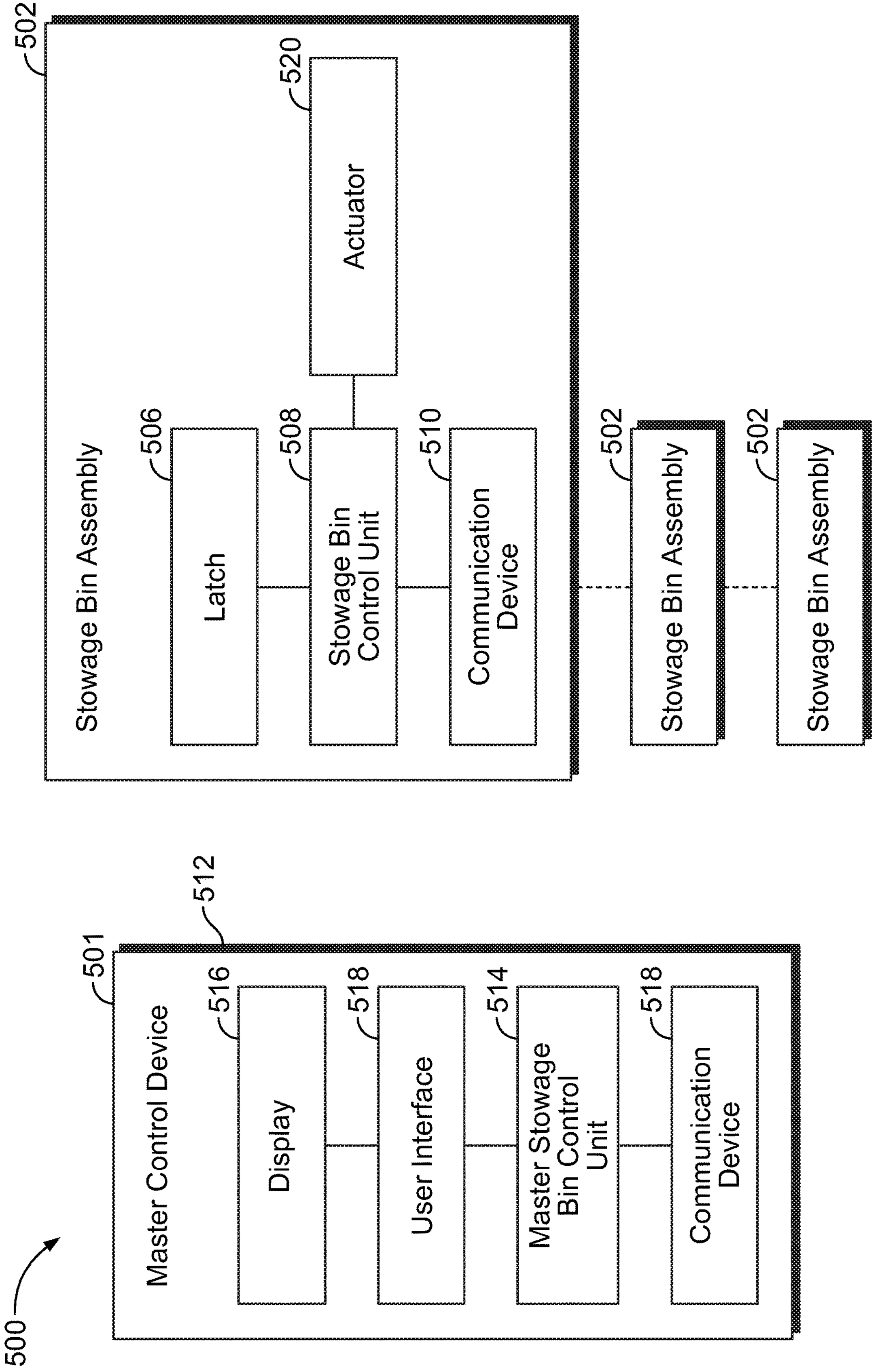
FIG. 9 illustrates a block diagram of a stowage bin control system, according to an embodiment of the present disclosure.

FIG. 9 illustrates a block diagram of a stowage bin control system 500, according to an embodiment of the present disclosure. The stowage bin control system 500 includes a plurality of stowage bin assemblies 502 (such as any of those described herein) in communication with a master control device 501 that is separate and distinct from the stowage bin assemblies 502. The stowage bin assemblies 502 may be positioned within a vehicle, such as described in the present application. The master control device 501 may also be located within the vehicle, such as within a cockpit, galley, or the like. In at least one embodiment, the master control device 501 may be, or part, of a control panel and/or computer station, within the vehicle. In at least one other embodiment, the master control device 501 may be, or part of, a handheld device, such as a handheld control device, a smart device, smart phone, tablet, and/or the like.

In at least one embodiment, the master control device 501 is communicatively coupled to all of the stowage bin assemblies 502 within a vehicle. In at least one embodiment, the single master control device 501 is used to control operation of multiple stowage bin assemblies 502. Optionally, the master control device 501 may be in communication with less than all of the stowage bin assemblies 502 within a vehicle. The vehicle may include more or less stowage bin assemblies 502 than shown in FIG. 9.

At least one of the stowage bin assemblies 502 includes a latch 506, a stowage bin control unit 508, and a communication device 510. The stowage bin control unit 508 is communicatively coupled to the latch 506 and the communication device 510 through one or more wired or wireless connections. Optionally, the stowage bin assembly 502 may not include the stowage bin control unit 508.

The latch 506 is operatively coupled to one or more latching mechanisms (such as the latching mechanism 400 shown in FIG. 8) that are configured to latch the stowage bin assembly 502 into a closed position. For example, the latch 506 may be operatively coupled to two latching mechanisms at opposite ends of the stowage bin assembly 502. Optionally, the latch 506 may be operatively coupled to a single latching mechanism. Also, optionally, the latch 506 may be operatively coupled to three or more latching mechanisms.

The latch 506 may be at various locations on the stowage bin assembly 502. For example, the latch 506 may be in the middle of a front panel, above the front panel, below the front panel, to a side of front panel, or the like. In at least one embodiment, the latch 506 may be located on a structural feature that is separate and distinct from the stowage bin assembly 502.

The master control device 501 includes a housing 512 that contains a master stowage bin control unit 514 communicatively coupled to a display 516, a user interface 518, and a communication device 518, such as through one or more wired or wireless connections. The display 516 may include a monitor, such as a touchscreen monitor, an LED monitor, a liquid crystal display (LCD) monitor, a plasma monitor, and/or the like. Optionally, the master control device 501 may not include the display 516. The user interface 518 may be or include a touchscreen surface of the display, a separate touchscreen surface, a keyboard, one or more buttons, or the like. The user interface 518 allows an individual to input commands into the master control device 518. The display 516 is configured to allow the individual to interact with the master control device 501 in order to input commands, review system status, and/or the like.

The stowage bin assembly 502 is communicatively coupled to the master control device 501 through the communication device 510, and the communication device 518 of the master control unit 514 through one or more wired or wireless connections. The communication devices 510 and 518 may be or include antennas (such as radio antennas), transceivers, other wireless communication systems (such as WiFi), or the like that are configured to allow wireless communication between the master control device 501 and the stowage bin assemblies 502. Alternatively, the master control device 501 may be in communication with the stowage bin assemblies 502 through one or more wired connections.

In at least one embodiment, the master control device 501 communicates with the stowage bin assemblies 502 within an aircraft through wireless connections. By wirelessly connecting the master control device 501 to the stowage bin assemblies 502, the aircraft is made substantially lighter, as there is no need to route wire bundles between the master control device 501 and the various stowage bin assemblies 502. Consequently, the lighter aircraft consumes less fuel, thereby saving costs. Moreover, space within the aircraft is conserved as wire bundles are not routed between the master control device 501 and the stowage bin assemblies 502. Further, the manufacturing process is easier and less costly, due to a lack of wiring that is routed between the master control device 501 and the stowage bin assemblies 502.

In operation, an individual (such as aircraft personnel) may control operation of the stowage bin assemblies 502 through the master control device 501. For example, the individual may input a locking command into the master control device 501 via the user interface 518. The master stowage bin control unit 514 receives the locking command and sends a locking control signal to one or more of the stowage bin assemblies 502 based on the locking command input into the master control device 501. For example, the individual may input a locking command that locks all of the stowage bin assemblies 502, or a subset thereof.

The stowage bin assembly 502 receives the locking control signal from the master stowage bin control unit 514 via the communication device 510. In response to the received control signal, the stowage bin control unit 508 operates the latch 506 to lock the stowage bin assembly 502, thereby preventing a passenger from opening the stowage bin assembly 502. Optionally, the stowage bin assemblies 502 may not include separate and distinct stowage bin control units 508. Instead, the master stowage bin control unit 514 may control the latch 506 without the intermediary stowage bin control unit 508.

As another example, an individual may input an unlocking command into the master control device 501 via the user interface 518. The master stowage bin control unit 514 receives the unlocking command and sends an unlocking control signal to one or more of the stowage bin assemblies 502 based on the unlocking command input into the master control device 501.

The stowage bin assembly 502 receives the unlocking control signal from the master stowage bin control unit 514 via the communication device 510. In response to the received control signal, the stowage bin control unit 508 operates the latch 506 to unlock the stowage bin assembly 502, thereby allowing a passenger to open the stowage bin assembly 502.

As another example, an individual may input an opening command into the master control device 501 via the user interface 518. The master stowage bin control unit 514 receives the opening command and sends an opening control signal to one or more of the stowage bin assemblies 502 based on the opening command input into the master control device 501.

The stowage bin assembly 502 receives the opening control signal from the master stowage bin control unit 514 via the communication device 510. In response to the received control signal, the stowage bin control unit 508 automatically opens the stowage bin assembly 502. For example, the stowage bin assembly 502 may include an actuator 520 (which may include the locking mechanism 400 shown in FIG. 8, one or more motors, a hydraulic sub-system, a pneumatic sub-system, an electrical opening system, and/or the like) that is configured to automatically open the stowage bin assembly 502 when commanded. The actuator 520 is communicatively coupled to the stowage bin control unit 508, which controls operation of the actuator 520. In at least one other embodiment, the actuator 520 may be configured to be directly controlled by the master stowage bin control unit 514, based on control signals received from the master stowage bin control unit 514.

As another example, an individual may input a closing command into the master control device 501 via the user interface 518. The master stowage bin control unit 514 receives the closing command and sends a closing control signal to one or more of the stowage bin assemblies 502 based on the closing command input into the master control device 501.

The stowage bin assembly 502 receives the closing control signal from the master stowage bin control unit 514 via the communication device 510. In response to the received control signal, the stowage bin control unit 508 automatically closes the stowage bin assembly 502. For example, the stowage bin assembly 502 may control the actuator 520 to automatically close the stowage bin assembly 502 when commanded.

In at least one embodiment, the master stowage bin control unit 514 may be programmed to automatically lock, unlock, open, and close the stowage bin assemblies 502. For example, the master stowage bin control unit 514 may be in communication with a flight computer, and operate the master stowage bin control unit 514 based on various phases of travel (such as takeoff, landing, periods of turbulence, taxiing, parking at a gate, etc.).

The master stowage bin control unit 514 and/or the stowage bin control units 508 may be programmed having control sequences for all or some of the functions described in the present application, including choreographed opening/closing of bins, and automatic locking of bins during certain portions of a trip. For example, the master stowage bin control unit 514 may operate to simultaneously open and/or close all of the stowage bin assemblies 502 onboard the vehicle. In at least one other embodiment, the master stowage bin control unit may operate to open and/or close in a synchronized and/or staggered fashion. In this manner, all of the stowage bin assemblies 502 may not close or open at the same time, which may otherwise consume increased amounts of energy and/or generate increased amounts of noise. In at least one embodiment, the master control device 501 and/or the stowage bin assemblies 502 are programmed to open or close in a wave action, which may or may not be synchronized with cabin lighting, sound schemes, and/or the like. For example, the stowage bin assemblies 502 may be opened or closed in connection with lighting effects emitted by interior cabin lights, sound signals emitted by interior speakers, and/or video or graphics displayed on one or more monitors or displays within the interior cabin. Further, pre-programmed control sequences ensure compliance with safety and security requirements as promulgated by the United States Federal Aviation Administration (FAA).

In at least one embodiment, the system 500 defaults to a manual override mode in which a user is able to manually open and close the bin. For example, if the master stowage bin control unit 514 receives error signals from one or more of the stowage bin control units 508, the master stowage bin control unit 514 may set the stowage bin assemblies 502 to the default mode.

The stowage bin control unit 508 of each stowage bin assembly 502 may be configured to report information to the master stowage bin control unit 514 so as to indicate health or status, such as bin capacity status, maintenance needs, and/or usage data that could speed loading and unloading procedures. For example, the stowage bin control unit 508 may monitor the stowage bin assembly 502 and output a report signal to the master stowage bin control unit 514. The report signal includes data regarding operational health or status of the stowage bin assembly 502.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the master stowage bin control unit 514 and the stowage bin control units 508 may be or include one or more processors that are configured to control operations, as described herein.

Each of the master stowage bin control unit 514 and the stowage bin control units 508 is configured to execute a set of instructions that are stored in one or more data storage units or elements (such as one or more memories), in order to process data. For example, each of the master stowage bin control unit 514 and the stowage bin control units 508 may include or be coupled to one or more memories. The data storage units may also store data or other information as desired or needed. The data storage units may be in the form of an information source or a physical memory element within a processing machine.

The set of instructions may include various commands that instruct each of the master stowage bin control unit 514 and the stowage bin control units 508 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, in response to results of previous processing, or in response to a request made by another processing machine.

The diagrams of examples herein may illustrate one or more control or processing units, such as the master stowage bin control unit 514 and the stowage bin control units 508.

It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, each of the master stowage bin control unit 514 and the stowage bin control units 508 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 10:
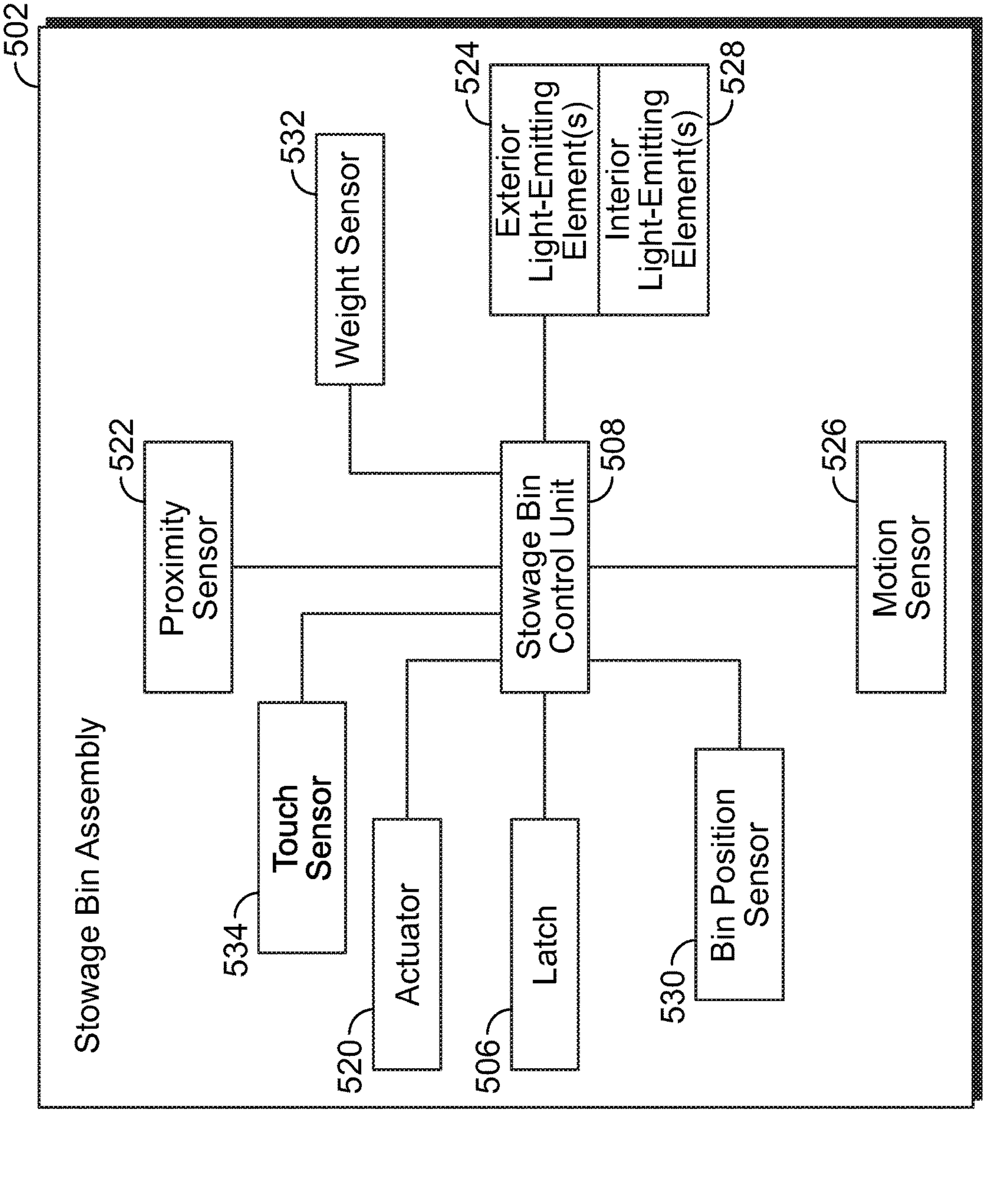
FIG. 10 illustrates a block diagram of a stowage bin assembly, according to an embodiment of the present disclosure.

FIG. 10 illustrates a block diagram of a stowage bin assembly 502, according to an embodiment of the present disclosure. The stowage bin assembly 502 is an example of the stowage bin assemblies described above with respect to FIGS. 1-9. The stowage bin assembly 502 may or may not be communicatively coupled to the master control device 501 shown in FIG. 9.

In at least one embodiment, the stowage bin assembly 502 includes a proximity sensor 522 that is configured to detect presence of an object within a close proximity, such as within a detection range of less than six inches. The proximity sensor 522 may be mounted to an outer surface of the stowage bin assembly 502, such as on the front panel 126 of the bucket 120 (shown in FIG. 4). In at least one embodiment, the proximity sensor 522 may be a radio frequency identification sensor and/or reader. The proximity sensor 522 may be mounted to the stowage bin assembly 502 proximate to the latch 506. In at least one embodiment, the proximity sensor 522 contacts or forms part of the latch 506.

In at least one embodiment, flight personnel may position a badge, such as an RFID badge, within a detection range of the proximity sensor 522. The flight personnel may move the RFID badge within the proximity sensor 522 to set the latch 506 in a locked state so that the stowage bin assembly 502 may not be opened. When in the locked state, one or more exterior light-emitting elements 524 (such as LEDs) which may be proximate or connected to the latch 506 may emit light at a particular color indicating a locked state. For example, when a passenger attempts to open the stowage bin assembly 502, such as by pressing the latch 506, the light-emitting element(s) 524 may emit a red light. In at least one other embodiment, the light-emitting emitting elements 524 may be arranged on a display and configured to emit light in text patterns. For example, the light-emitting elements 524 may operate to indicate an illuminated "LOCKED" message.

In order to allow the stowage bin assembly 502 to be opened by passengers, the flight attendant may re-swipe the RFID badge proximate to the proximity sensor 522, which transitions the latch 506 back to an unlocked state. The exterior light-emitting element(s) 524 may then emit light (such as green light) or text (such as "UNLOCKED") to indicate that the stowage bin assembly 502 is unlocked. Optionally, the stowage bin assembly 502 may not include the proximity sensor 522.

In at least one embodiment, the stowage bin assembly 502 may include a motion sensor 526 proximate to the latch 506. The motion sensor 526 may connect to the latch 506, or be mounted on the latch 506. The motion sensor 526 is configured to detect motion within a detection range, such as within six inches from the latch 506. The motion sensor 526 may be an ultrasonic sensor, an infrared sensor, or the like.

In operation, the motion sensor 526 may be engaged to automatically open the stowage bin assembly 502 without an individual touching the latch 506 or another other portion of the stowage bin assembly 502. For example, when an individual waves a hand within the detection range of the motion sensor 526, the motion sensor 526 sends an opening signal to the stowage bin control unit 508, the actuator 520, and/or the latch 506. The opening signal causes the actuator 520 to open the stowage bin assembly 502 without manual intervention. In at least one embodiment, when the stowage bin assembly 502 is in an open state, an object (such as a hand) that passes within the detection range of the motion sensor 526 causes the actuator 520 to automatically close the stowage bin assembly 502 without manual intervention. Optionally, the stowage bin assembly 502 may not include the motion sensor 526.

In at least one embodiment, the stowage bin assembly 502 may include one or more interior light-emitting elements 528, such as one or more LEDs. In at least one embodiment, the stowage bin control unit 508 is configured to operate the interior light-emitting elements 528 (and/or the exterior light-emitting elements 524). The interior light-emitting elements 528 may be within the stowage bin assembly 502, such as within the baggage retaining chamber 144 shown in FIG. 5, secured to a strongback, or the like. The interior light-emitting elements 528 are configured to illuminate the baggage retaining chamber 144. For example, when the stowage bin assembly 502 is opened, the interior light-emitting elements 528 may illuminate the interior of the open stowage bin assembly 502. When the stowage bin assembly 502 is closed, the light-emitting elements 528 deactivate. The stowage bin control unit 508 may be configured to operate the interior light emitting elements 528 based on whether the stowage bin assembly 502 is opened or closed. In at least one other embodiment, the interior light emitting elements 528 may be controlled by a switch that is in communication with the actuator 520 and/or the latch 506.

In at least one embodiment, the interior light-emitting elements 528 may emit light that gradually intensifies as the stowage bin assembly 502 is opened. Further, the interior light-emitting elements 528 may emit light that gradually fades and ceases as the stowage bin assembly 502 is closed. Optionally, the stowage bin assembly 502 may not include the interior light-emitting element(s) 528.

In at least one embodiment, the stowage bin assembly 502 may include a bin position sensor 530 in communication with the stowage bin control unit 508, such as through one or more wired or wireless connections. The bin position sensor 530 may be one or more of an accelerometer, an encoder, an angular position detector, a load sensor, a spatial integrator sensor, and/or the like that is configured to detect a position of the stowage bin assembly 502 (such as whether in a closed state or an open state). The stowage bin control unit 508 receives one or more signal(s) from the bin position sensor 530 to determine the position of the stowage bin assembly 502. The master control device 501 (shown in FIG. 9) may communicate with the stowage bin control unit 508 and determine the position of the stowage bin assembly 502 and other stowage bin assemblies within a vehicle. Optionally, the stowage bin assembly 502 may not include the bin position sensor 530.

In at least one embodiment, the stowage bin assembly 502 may include a weight sensor 532, such an electronic scale, communicatively coupled to the stowage bin control unit 508, such as through one or more wired or wireless connections. The weight sensor 532 is configured to detect the weight of the stowage bin assembly 502. The stowage bin control unit 508 (and/or the master stowage bin control unit 514 shown in FIG. 9) monitors signals output by the weight sensor 532 and compares them against one or more weight thresholds stored in a memory. For example, if the weight of the stowage bin assembly 502 exceeds a maximum weight threshold (due to the amount of baggage within the stowage bin assembly 502), the stowage bin control unit 508 may output an alert, such as to the master control device 501 (shown in FIG. 9) indicating that at least some contents within the stowage bin assembly 502 are to be removed. As another example, in response to the weight of the stowage bin assembly 502 being under a predetermined range of the maximum weight threshold, the stowage bin control unit 508 may operate the actuator 520 to automatically close the stowage bin assembly 502, and operate the latch 506 into a locked position.

In at least one embodiment, the weight sensor 522 is securely coupled to a portion of the stowage bin assembly 502. For example, the weight sensor 522 may be mounted to the front panel 126 (shown, for example, in FIG. 5), an end panel 132 and/or 134 (shown, for example, in FIG. 5). The weight sensor 522 may be securely mounted to an interior or exterior surface of the front panel 126, or an end panel 132 and/or 134. In at least one embodiment, the weight sensor 522 may be embedded within a portion of the stowage bin assembly 502, such as within the front panel 126, the end panel 132, and/or the end panel 134.

In at least one embodiment, the stowage bin assembly 502 may also include at least one touch sensor 534, such as a touch screen interface, a capacitive sensor, an acoustic wave sensor, and/or the like. The touch sensor 534 is communicatively coupled to one or both of the stowage bin control unit 508 and/or the latch 506, and is configured to be touched (such as through pressing, swiping, or the like). When engaged, the touch sensor 534 sends a signal to the stowage bin control unit 508 and/or the latch 506 that selectively locks the latch 506, unlocks the latch 506, or opens the stowage bin assembly 502.

Figure 11:
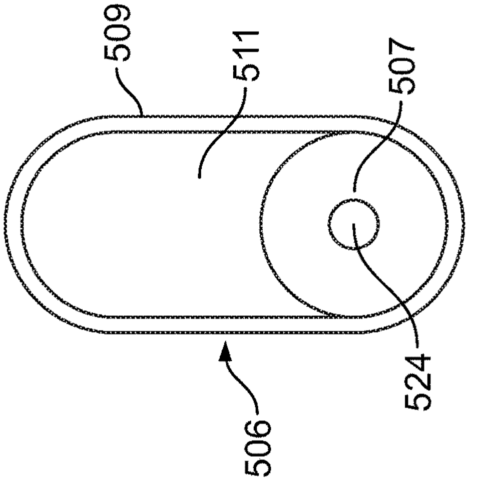
FIG. 11 illustrates a front view of a latch, according to an embodiment of the present disclosure.

FIG. 11 illustrates a front view of the latch 506, according to an embodiment of the present disclosure. FIG. 11 illustrates an example of the latch 506. However, the latch 506 may be sized and shaped differently than shown in FIG. 11. For example, the latch 350 shown in FIG. 7 may be used.

The latch 507 may include an engagement button 507 secured within a frame or housing 509. A cover 511 and/or space above the engagement button 507 may contain and/or cover the motion sensor 526, the proximity sensor 522, and/or the exterior light-emitting element(s) 524 shown and described with respect to FIG. 10. In at least one embodiment, the light-emitting element(s) 524 may be mounted within the engagement button 507.

Figure 12:
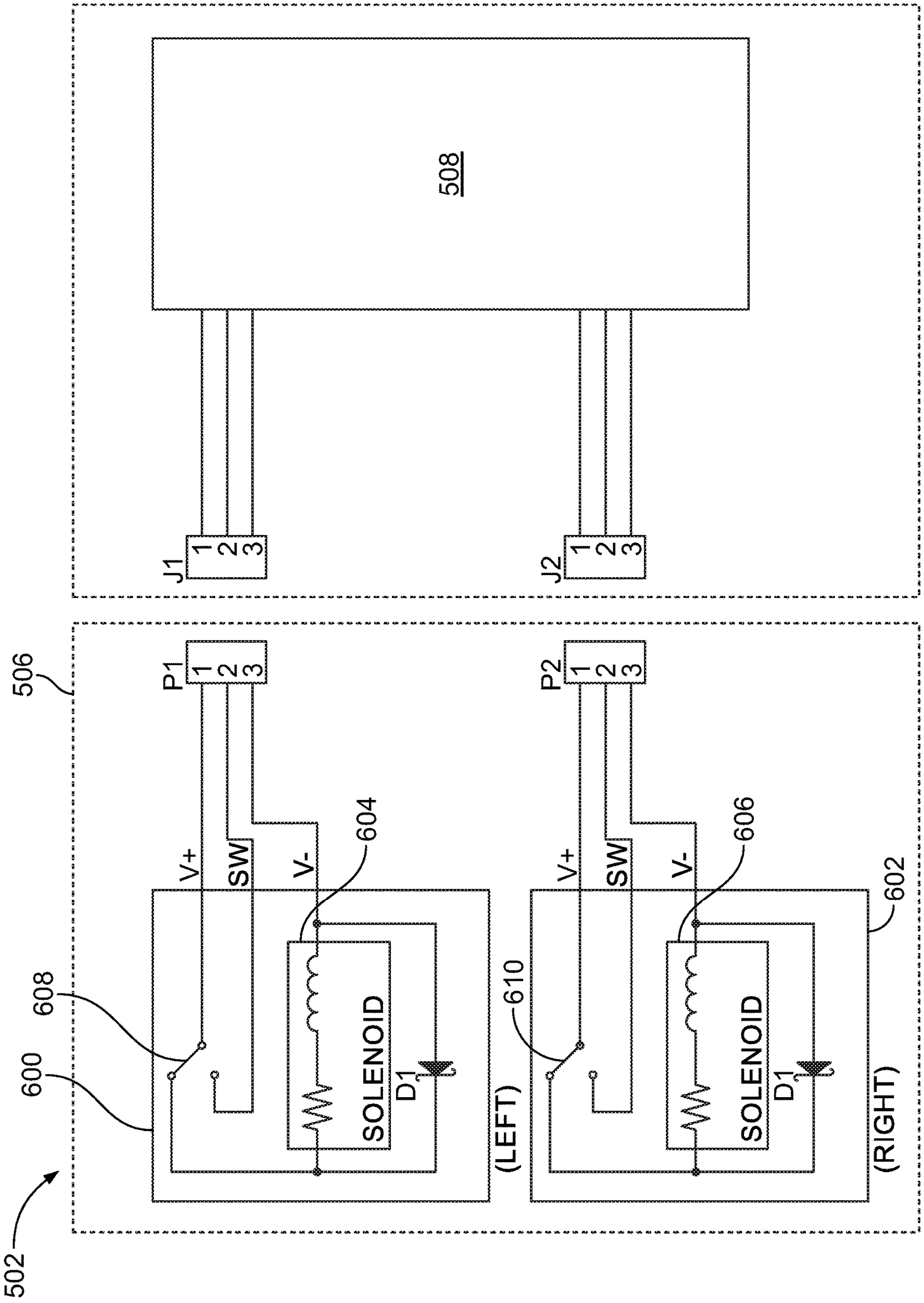
FIG. 12 illustrate a circuit diagram of a stowage bin control unit coupled to a latch, according to an embodiment of the present disclosure.

FIG. 12 illustrate a circuit diagram of a stowage bin control unit 508 coupled to a latch 506, according to an embodiment of the present disclosure. The latch 506 may include or otherwise be coupled to one or more latching mechanisms, such as latching mechanisms 600 and 602. For example, a stowage bin assembly may include a left or fore latching mechanism and a right or aft latching mechanism. The latching mechanisms 600 and 602 may include respective solenoids 604 and 606 that are coupled to respective switches 608 and 610. The stowage bin control unit 508 is configured to operate the solenoids 604 and 606 to open the stowage bin assembly, based on input commands.

The stowage bin control unit 508 may monitor signals received from the latching mechanisms 600 and 602 to determine whether the stowage bin assembly 502 is in a desired position. For example, if the stowage bin assembly 502 is to be in an open position, but the stowage bin assembly 502 receives conflicting signals from the latching mechanisms 600 and 602, the stowage bin control unit 508 may determine an error condition (such as a malfunctioning latching mechanism). The stowage bin control unit 508 may output an error signal, which may be shown on the stowage bin assembly 502 (such as via the exterior light-emitting elements 524), to the master control device 501.

FIG. 12 illustrates one example of the stowage bin control unit 508 in relation to the latch 506. The stowage bin control unit 508 may be operatively coupled to the latch in various other ways. For example, the latch 506 may include or be coupled to only a single latching mechanism. In at least one other embodiment, instead of or in addition to solenoids, the latching mechanisms may include motors that are configured to open and close the stowage bin assembly 502.

Figure 13:
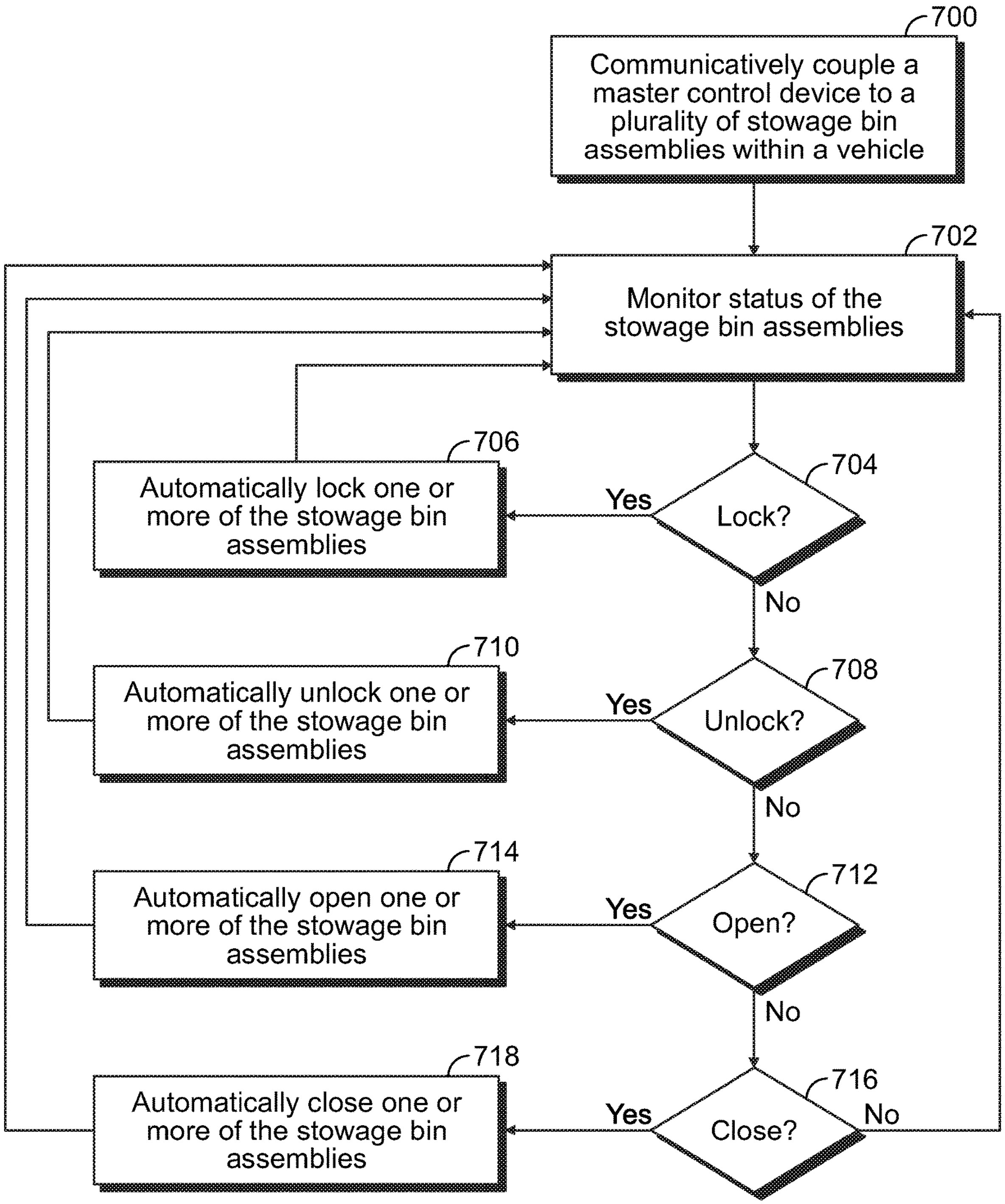
FIG. 13 illustrates a flow chart of a stowage bin control method, according to an embodiment of the present disclosure.

FIG. 13 illustrates a block diagram of a stowage bin control method, according to an embodiment of the present disclosure. Referring to FIGS. 9 and 13, the method begins at 700, at which the master control device 501 is communicatively coupled to a plurality of stowage bin assemblies 502. For example, the master stowage bin control unit 514 of the master control device 501 is in communication with the stowage bin control units 508 of the stowage bin assemblies, such as through wireless communication.

Next, at 702, the master control device 501 monitors status of the stowage bin assemblies 502. For example, the master stowage bin control unit 514 receives signals output from the stowage bin assemblies 502 (such as via the stowage bin control units 508) to determine whether the latches 506 are locked or unlocked, the stowage bin assemblies 502 are open or closed, the capacity of the stowage bin assemblies 502, and/or the like.

At 704, the master control stowage bin control unit 514 determined whether one or more of the stowage bin assemblies 704 should be locked. For example, flight personnel may input a locking command into the master stowage bin control unit 514, or the master stowage bin control unit 514 may detect a condition (such as during a particular restricted phase of a flight) that triggers a locking command. If the stowage bin assemblies are to be locked, the master stowage bin control unit 514 outputs a lock command signal that automatically locks one or more of the stowage bin assemblies 502 at 706. The method then returns to 702.

If, however, the stowage bin assemblies 704 do not need to be actuated into a locked position (such as if they are already locked), or if there is no need to lock the stowage bin assemblies 502 at 704, the method proceeds to 708, at which the master stowage bin control unit 514 determines whether the stowage bin assemblies are to be unlocked at 708. For example, flight personnel may input an unlocking command into the master stowage bin control unit 514, or the master stowage bin control unit 514 may detect a condition that triggers an unlocking command (such as after an aircraft has parked at a gate).

If the stowage bin assemblies 502 are to be unlocked at 708, the method proceeds to 710, at which the master stowage bin control unit 514 automatically unlocks one or more of the stowage bin assemblies 502. The method then returns to 702.

If at 708 the stowage bin assemblies are already unlocked, or do not need to be unlocked, the method proceeds to 712, at which the master stowage bin control unit 514 determines whether the stowage bin assemblies 502 are to be automatically opened, such as when an aircraft is parked at a gate. If the stowage bin assemblies 502 are to be opened, the method proceeds to 714, at which the master stowage bin control unit 514 automatically opens one or more of the stowage bin assemblies 502. The method then returns to 702.

If at 712 the stowage bin assemblies are already opened, or do not need to be opened, the method proceeds to 716, at which the master stowage bin control unit 514 determines whether the stowage bin assemblies 502 are to be automatically closed, such as when an aircraft is taxiing to a runway in order to takeoff. If the stowage bin assemblies 502 are to be closed, the method proceeds to 718, at which the master stowage bin control unit 514 automatically closes one or more of the stowage bin assemblies 502. The method then returns to 702. If, however, the stowage bin assemblies 502 are not to be closed, the method returns to 702.

Steps 704, 708, 712, and 716 may occur in a different order than shown. For example, the master stowage bin control unit 502 may analyze steps 704, 708, 712, and 716 concurrently.

As described above, certain embodiments of the present disclosure provide stowage bin assemblies that may be opened and closed without being touched by an individual. Certain embodiments of the present disclosure provide stowage bin assemblies that may be controlled by flight personnel. Certain embodiments of the present disclosure provide systems and methods of preventing passengers from opening a stowage bin assembly during restricted periods, such as during takeoff, landing, and periods of turbulence.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A stowage bin assembly within an interior cabin of a vehicle, the stowage bin assembly comprising:

a strongback;

a bucket moveably coupled to the strongback, wherein a baggage retaining chamber is defined, at least in part, by the bucket, and wherein the baggage retaining chamber is sized and configured to receive and retain carry-on luggage; and one or more interior light-emitting elements configured to illuminate the baggage retaining chamber of the stowage bin assembly, wherein the one or more interior light-emitting elements are configured to illuminate the baggage retaining chamber when the stowage bin assembly is in an open position, and wherein each of the one or more interior light-emitting elements are deactivated when the stowage bin assembly is in a closed position.

2. The stowage bin assembly of claim 1, wherein the one or more interior light-emitting elements are disposed within the baggage retaining chamber of the stowage bin assembly.

3. The stowage bin assembly of claim 1, wherein the one or more interior light-emitting elements emit light that gradually intensifies as the stowage bin assembly is opened, and wherein the one or more interior light-emitting elements emit light that gradually fades as the stowage bin assembly is closed.

4. The stowage bin assembly of claim 1, wherein the bucket includes a front panel connected to a forward end panel and an aft end panel, and wherein the baggage retaining chamber is defined, at least in part, between the front panel, the forward end panel, and the aft panel.

5. The stowage bin assembly of claim 4, wherein the front panel comprises an arcuate panel having a curved outer surface.

6. The stowage bin assembly of claim 1, further comprising one or more exterior light-emitting elements.

7. The stowage bin assembly of claim 6, wherein the one or more exterior light-emitting elements are configured to emit light to indicate a current status of the stowage bin assembly.

8. The stowage bin assembly of claim 1, further comprising a stowage bin control unit in communication with the one or more interior light-emitting elements, wherein the stowage bin control unit is configured to operate the one or more interior light-emitting elements.

9. The stowage bin assembly of claim 1, wherein the one or more interior light-emitting elements are within a closed area of the stowage bin assembly.

10. The stowage bin assembly of claim 1, wherein the one or more interior light-emitting elements are secured to the strongback.

11. The stowage bin assembly of claim 1, further comprising:

a sensor configured to determine a rotational position of the bucket.

12. A method of operating a stowage bin assembly within an interior cabin of a vehicle, the method comprising:

illuminating a baggage retaining chamber of the stowage bin assembly with one or more interior light-emitting elements, wherein the stowage bin assembly includes a strongback, and a bucket moveably coupled to the strongback, wherein the baggage retaining chamber is defined, at least in part, by the bucket, and wherein the baggage retaining chamber is sized and configured to receive and retain carry-on luggage, wherein the illuminating comprises:

illuminating the baggage retaining chamber by one or more interior light-emitting elements when the stowage bin assembly is in an open position; and deactivating each of the one or more interior light-emitting elements when the stowage bin assembly is in a closed position.

13. The method of claim 12, wherein the one or more light-emitting elements are disposed within the baggage retaining chamber of the stowage bin assembly.

14. The method of claim 12, wherein the illuminating comprises:

emitting light that gradually intensifies as the stowage bin assembly is opened, and emitting light that gradually fades as the stowage bin assembly is closed.

15. The method of claim 12, further comprising emitting light from one or more exterior light-emitting elements secured to the stowage bin assembly.

16. The method of claim 15, wherein the emitting light from the one or more exterior light-emitting elements comprises emitting light to indicate a current status of the stowage bin assembly.

17. The method of claim 12, further using a stowage bin control unit to operate the one or more interior light-emitting elements.

18. A vehicle comprising:

an interior cabin; and a plurality of stowage bin assemblies within the interior cabin, wherein at least one of the plurality of stowage bin assemblies comprises:

a strongback;

a bucket moveably coupled to the strongback, wherein a baggage retaining chamber is defined, at least in part, by the bucket, and wherein the baggage retaining chamber is sized and configured to receive and retain carry-on luggage; and one or more interior light-emitting elements configured to illuminate the baggage retaining chamber of at least one of the plurality of stowage bin assemblies, wherein the one or more interior light-emitting elements are configured to illuminate the baggage retaining chamber when the at least one of the plurality of stowage bin assemblies is in an open position, and wherein each of the one or more interior light-emitting elements are deactivated when the at least one of the plurality of stowage bin assemblies is in a closed position.

19. The vehicle of claim 18, wherein the one or more interior light-emitting elements are disposed within the baggage retaining chamber of the stowage bin assembly.

20. The vehicle of claim 18, wherein the one or more interior light-emitting elements emit light that gradually intensifies as the at least one of the plurality of stowage bin assemblies is opened, and wherein the one or more interior light-emitting elements emit light that gradually fades as the at least one of the plurality of stowage bin assemblies is closed.

* * * * *